(12) United States Patent
Dalcher

(10) Patent No.: US 7,779,422 B1
(45) Date of Patent: Aug. 17, 2010

(54) SYSTEM, METHOD, AND COMPUTER PROGRAM PRODUCT FOR COMPATIBILITY AMONG HOOKING APPLICATIONS

(75) Inventor: Gregory William Dalcher, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 1351 days.

(21) Appl. No.: 11/244,830

(22) Filed: Oct. 5, 2005

(51) Int. Cl.
G06F 3/00 (2006.01)
G06F 9/44 (2006.01)
G06F 9/46 (2006.01)
G06F 13/00 (2006.01)
G06F 11/00 (2006.01)
H04L 9/32 (2006.01)
G08B 23/00 (2006.01)

(52) U.S. Cl. ................ 719/318; 719/328; 719/331; 719/332; 717/124; 717/127; 714/47; 714/48; 726/2; 726/22

(58) Field of Classification Search .............. 719/318, 719/331–332, 328; 717/124, 127; 714/47, 714/48; 726/2, 22
See application file for complete search history.

(56) References Cited

U.S. PATENT DOCUMENTS

| | | | | |
|---|---|---|---|---|
| 6,421,738 | B1* | 7/2002 | Ratan et al. | 719/328 |
| 6,678,734 | B1 | 1/2004 | Haatainen et al. | 709/230 |
| 2004/0025170 | A1* | 2/2004 | Cao | 719/318 |
| 2004/0237071 | A1* | 11/2004 | Hollander et al. | 717/124 |

OTHER PUBLICATIONS

Kaplan, Yariv, "API Spying Techniques for Windows 9x, NT and 2000", 2000.*
"McAfee® Entercept™ software User's Guide Revision 1, version 5.0", McAfee Software, Issued Mar. 2004.

* cited by examiner

Primary Examiner—Qing-Yuan Wu
(74) Attorney, Agent, or Firm—Zilka-Kotab, PC

(57) ABSTRACT

A system, method and computer program product for permitting use of multiple hooking applications to hook an interface. Included are a first hooking application and a second hooking application. Further provided is computer code including a vector and a stub dynamic link library (DLL) for permitting the first hooking application and the second hooking application to both hook an interface.

19 Claims, 6 Drawing Sheets

SYSTEM, METHOD, AND COMPUTER PROGRAM PRODUCT FOR COMPATIBILITY AMONG HOOKING APPLICATIONS

FIELD OF THE INVENTION

The present invention relates to interfaces, and more particularly to applications for hooking interfaces.

BACKGROUND OF THE INVENTION

Hooking applications are becoming increasingly popular, especially in the security and network management arts. Such hooking applications are adapted for hooking various aspects of an interface. By way of example, some of such applications are capable of hooking application program interface (API) calls.

Such API hooking is a technique where an API is modified so that subsequent invocations of a particular function transfers control to a handler. This handler may then, in turn, analyze the original API invocation, report usage of the API, modify relevant parameters, etc. Further, in the case of security applications, API hooking may serve to enable a decision as to allowing or disallowing the original API to be invoked.

As the foregoing hooking applications become more and more prevalent, there is an increasing likelihood that more than one hooking application may reside on a single system. Unfortunately, hooking applications have historically been unable to coexist.

This scenario of multiple co-existing hooking applications (e.g. a first hooking application and a second hooking application, etc.) presents various problems. For example, the second hooking application, as part of its handling of API interceptions, typically invokes what it perceives as the original API upon completion of handling. If, however, the first hooking application was already hooking the API when the second hooking application started, the second hooking application will invoke the first hooking application.

This presents a particular problem if the first hooking application relies on a return address to transfer control to a handler of the first hooking application. Normally, this return address points back to the original API and results from the transfer of control from the original API to the first hooking application handler. However, if the second hooking application invokes the first hooking application, the return address points, instead, into the first hooking application. One common reason to use this return address is to identify which API was originally invoked to allow reuse of a common interception handler for all hooks. Unfortunately, if such return address points back to the first hooking application, the use of the return address in the abovementioned scenario results in failure.

Another problem concerns the situation where the first hooking application unloads. In this case, the second hooking application, while attempting to invoke what it perceives as the original API, transfers control to an address that is not valid (since the first hooking application is unloaded). To this end, the instant process, or even the entire system, is subject to failure.

There is thus a need for overcoming these and/or other problems associated with the prior art.

SUMMARY

A system, method and computer program product for permitting use of multiple hooking applications to hook an interface. Included are a first hooking application and a second hooking application. Further provided is computer code including a vector and a stub dynamic link library (DLL) for permitting the first hooking application and the second hooking application to both hook an interface.

DETAILED DESCRIPTION

Figure 1:
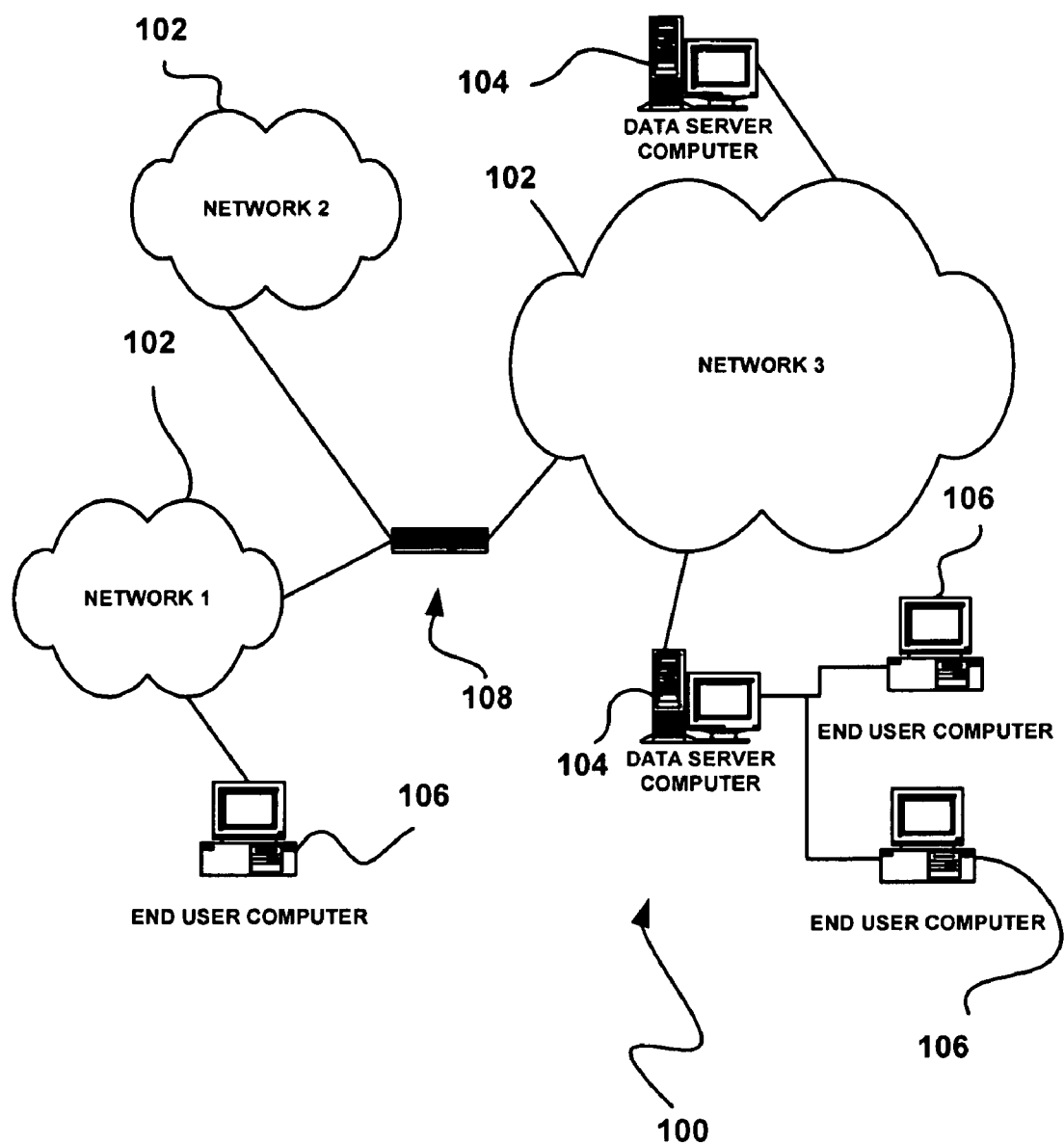
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are data server computers 104 which are capable of communicating over the networks 102. Also coupled to the networks 102 and the data server computers 104 is a plurality of end user computers 106. Such data server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

It should be noted that any of the foregoing network devices in the present network architecture 100, as well as any other unillustrated hardware and/or software, may be equipped with two or more hooking applications and computer code including a vector and a stub dynamic link library (DLL) capable of permitting the hooking applications to both hook an interface.

In the context of the present description, such hooking applications may include a security hooking application (e.g. intrusion detection hooking application, etc.), management hooking application, and/or any computer program capable of hooking an interface. Further, such hooking may refer to any location in code, interface, program, instruction, etc. that is capable of allowing incorporation of an additional capability, processing, etc. in association with an interface. Still yet, the aforementioned interface may include an application program interface (API), component object model (COM) interface, an executable code interface, any aspect of an interface (e.g. calls, commands, etc.), and/or any interface or component thereof, for that matter.

More information regarding optional functionality and optional architectural components associated with such feature will now be set forth for illustrative purposes.

Figure 2:
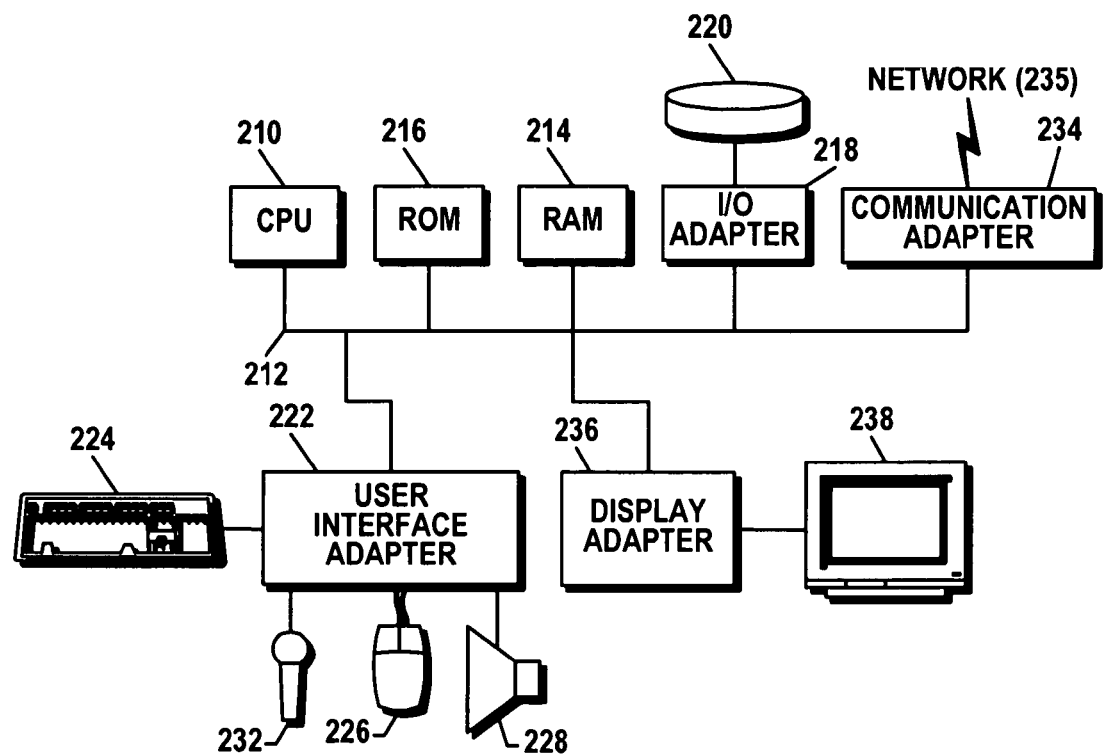
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
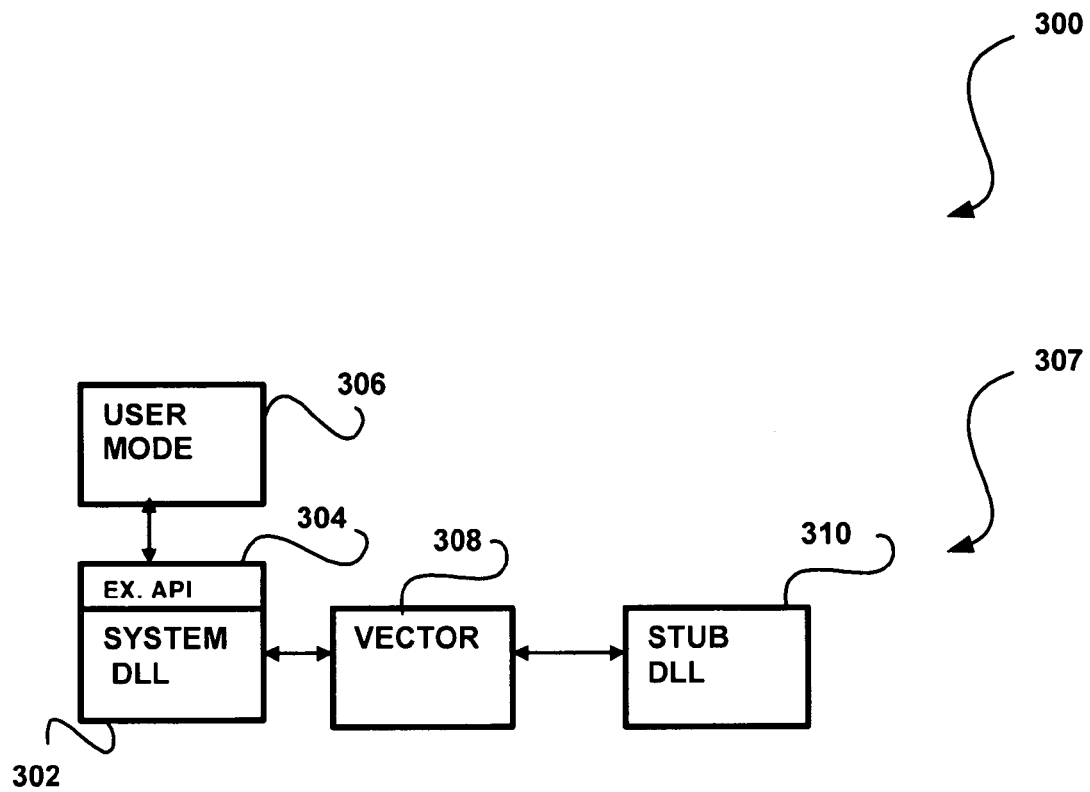
FIG. 3 shows a system for permitting hooking application compatibility, in accordance with one embodiment.

FIG. 3 shows a system 300 for permitting hooking application compatibility, in accordance with one embodiment. As an option, the present system 300 may be implemented in the context of the architecture and environment of FIGS. 1 and/or 2. Of course, however, the system 300 may be carried out in any desired environment.

As shown, a system dynamic link library (DLL) 302 is provided in association with an exported application program interface (API) 304 that interfaces a user mode process 306, in a standard manner. Further, for reasons that will soon become apparent, computer code 307 is provided which is capable of permitting a first and second hooking application (not shown) to co-exist on the system 300 and to both hook the interface 304 simultaneously, if desired.

In one embodiment, the computer code 307 may include at least one vector 308 and a stub DLL 310. In the context of the present description, the vector 308 may include any portion of memory (of any type) allocated to a particular hook. As an option, in one embodiment, the vector 308 may further include executable code capable of being used for identifying data associated with an invoked interface (e.g. API 304, etc.) corresponding to the hook. Upon collecting the data, the vector 308 may store the same in the aforementioned allocated portion of memory. Of course, in various embodiments, the vector 308 may simply include the invoked interface-describing data.

Armed with such data associated with the invoked interface, a handler associated with the corresponding hooking application may be called by the vector for performing further processing utilizing such data, in a manner that will soon become apparent. To transfer control to such handler, each vector 308 includes the address of the handler which may, in turn, invoke the original interface. By using the vector 308, it is known if the invoked interface is associated with another hooking application, so that such situation may be accommodated if necessary.

The aforementioned stub DLL 310 is loaded when a hooking application is initiated. In use, the stub DLL 310 stores the handler which is called by the vector 308. The stub DLL 310 does not necessarily get unloaded when the hooking application exits. When the hooking application restarts, such application may simply locate the stub DLL 310 and reuse it when performing associated interface hooking.

In use, the handler associated with the stub DLL 310 may, in turn, call another handler with additional functionality that is stored in the system DLL 302. Further, the system DLL 302 may be unloaded, upgraded etc. along with an associated hooking application unload, upgrade, etc., since the stub DLL 310 provides a persistent location for storing a handler that is available even when one of the hooking applications is unloaded, upgraded, etc.

More illustrative information will now be set forth regarding various optional architectures and features with which the foregoing system 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
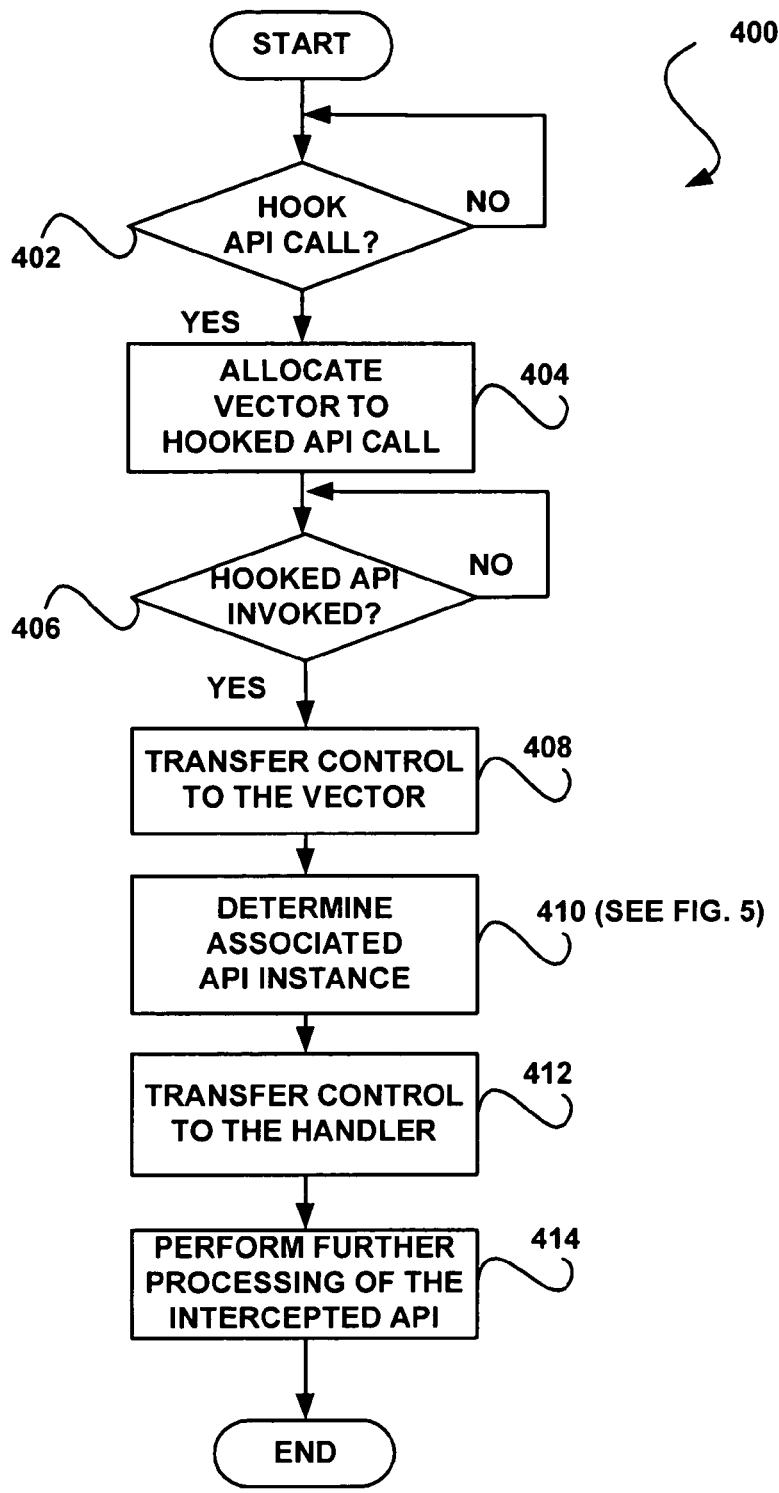
FIG. 4 shows a method for permitting hooking application compatibility utilizing at least one vector, in accordance with one embodiment.

FIG. 4 shows a method 400 for permitting hooking application compatibility utilizing at least one vector, in accordance with one embodiment. As an option, the present method 400 may be implemented in the context of the architecture and environment of FIGS. 1-2. Of course, however, the method 400 may be carried out in any desired environment.

While the present embodiment involves hooking applications which hook API calls, it should be noted that such embodiment is not limited to such, as any type of interface or component thereof may be hooked. As shown, it is initially determined whether an API call is hooked in decision 402. It should be noted that, in use, a vector (e.g. see, for example, the vector 308 of FIG. 3, etc.) may be created for each hooked call. Note operation 404. In other words, one vector may exist for every instance an API is hooked.

To this end, upon it being determined that a hooked API has been invoked (e.g. run, requested to perform a task, etc.) in decision 406, control may be transferred to the vector associated with the hooked API call. See operation 408. As mentioned previously, the vector may include executable code to administer such control and the associated functionality that will now be set forth. To this end, the vector is executed upon the associated interface being invoked.

Next, in operation 410, data associated with the invoked interface is identified utilizing the associated vector. As will soon become apparent, such data describes the hooked API that has been invoked. One exemplary technique for identifying and retrieving such data, in accordance with operation 408, will be set forth in greater detail during reference to FIG. 5.

In operation 412, control is then transferred to a main handler such that further processing of the intercepted API may be carried out, in accordance with operation 414. In use, such further processing may utilize the data collected in operation 410. For example, different processing may be appropriate for different APIs. To this end, the data may be used to identify the hooked API that has been invoked, and then carry out processing tailored for the API.

For example, an intrusion detection hooking application may employ a first intrusion detection pattern matching algorithm for a first type of hooked API and perform a second intrusion detection pattern matching algorithm for a second type of hooked API. Still yet, if a first hooking application identifies an invoked API to be associated with a second hooking application, such determination may be used to avoid the various prior art problems discussed hereinabove. One example of such feature will be set forth later in greater detail.

Figure 5:
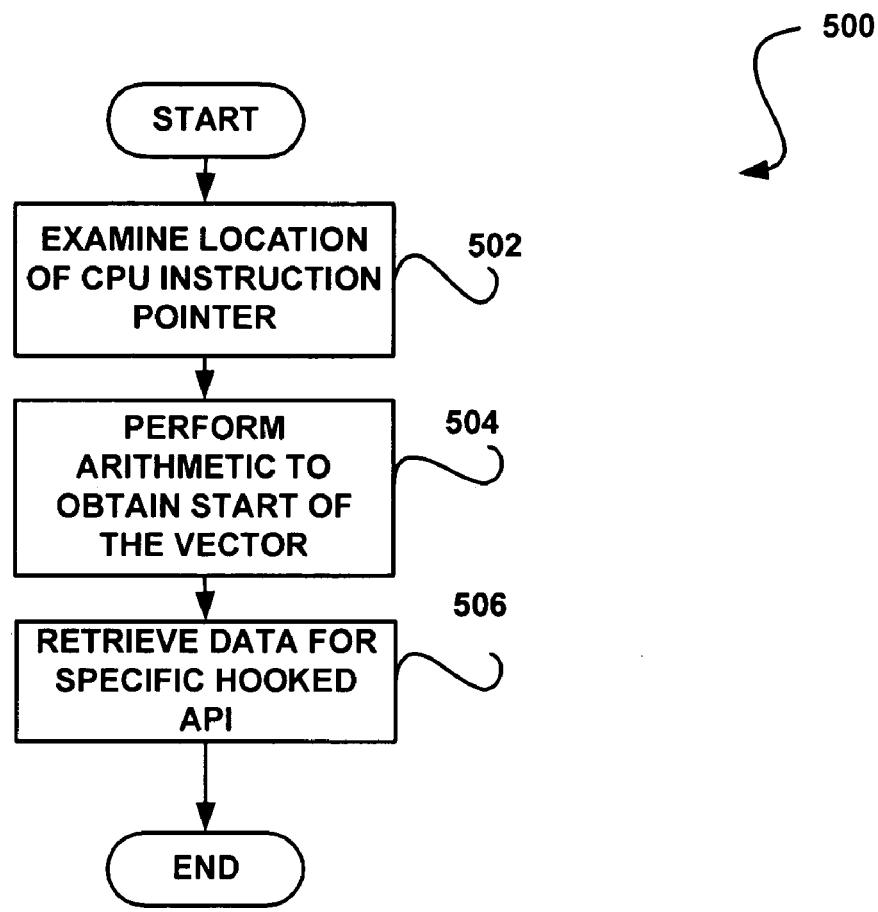
FIG. 5 shows a method for identifying data associated with an invoked interface utilizing an associated vector, in accordance with one embodiment.

FIG. 5 shows a method 500 for identifying data associated with an invoked interface utilizing an associated vector, in accordance with one embodiment. As an option, the present method 500 may be implemented in the context of the architecture and environment of FIGS. 1-4 and, in particular, in the context of operation 410 of FIG. 4. Of course, however, the method 500 may be carried out in any desired environment.

As shown, the data associated with the invoked interface is first identified by locating a central processing unit (CPU) instruction pointer. Note operation 502. Since it is not typically feasible to have data pushed onto a stack before transferring control from the original API, the vector examines where the CPU instruction pointer is currently pointing, per operation 502, as it is known that such instruction pointer is pointing to the vector.

Next, in operation 504, a start of the appropriate vector is identified utilizing arithmetic (e.g. by simply counting a predetermined number of bits from the instruction pointer location, etc.). Since each vector corresponds to a specific API hook instance, obtaining such start of the vector allows a one-to-one correlation to be made, and the data for the specific hooked API to be found. See operation 506.

Figure 6:
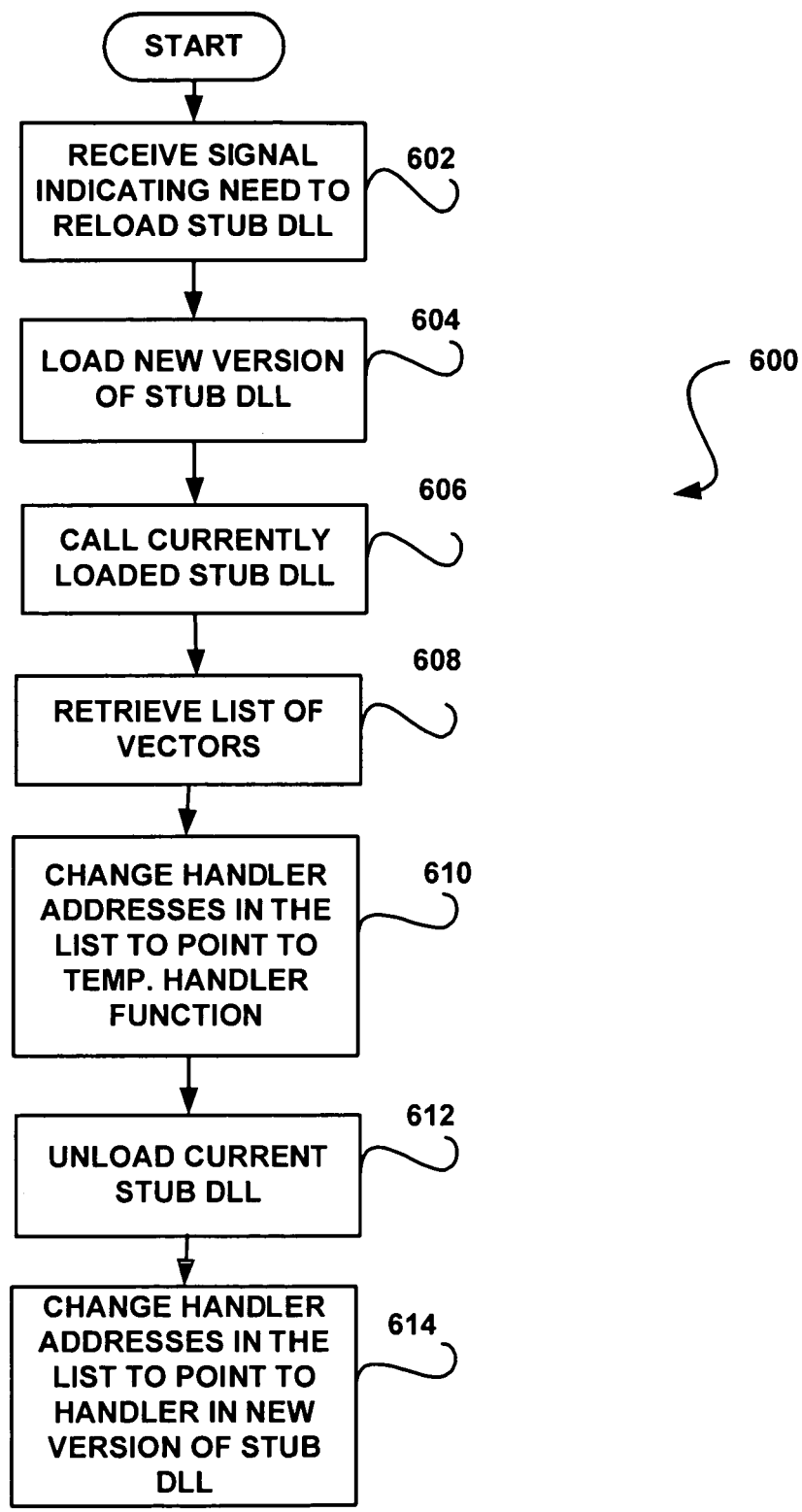
FIG. 6 shows a method for reloading a stub dynamic link library (DLL), in accordance with one embodiment.

FIG. 6 shows a method 600 for reloading a stub DLL, in accordance with one embodiment. As an option, the present method 600 may be implemented in the context of the architecture and environment of FIGS. 1-5. Of course, however, the method 600 may be carried out in any desired environment.

As shown, the present method 600 is initiated in response to the receipt of a signal indicating a need for a stub DLL (e.g. see, for example, the stub DLL 320 of FIG. 3, etc) to be reloaded. Note operation 602. Such signal may be initiated by an application (e.g. a hooking application, etc.) or any other controlling software indicating the need for an update or upgrade.

It should be noted that such reload is often necessary when a hooking application is to be updated or upgraded in any capacity. During such updating/upgrading, the system is subject to failure. As mentioned earlier, any updating/upgrading of the stub DLL should be done in a safe manner so that, at no point, does a secondary hooking application fail to have a valid address to which to transfer control. This window of vulnerability during stub DLL updating/upgrading is addressed by the subsequent operations.

Next, in operations 604 and 606, a new version of such stub DLL is loaded and a currently loaded stub DLL is called, respectively. This may be accomplished by a loader or the like (and associated exported function, etc.) that is initiated by the signal of operation 602. Thereafter, a list of each of the vectors is retrieved, as indicated in operation 608.

To this end, handler addresses in the list of vectors may be changed to point to a temporary handler. See operation 610. Thereafter, the current stub DLL may be unloaded in operation 612, after which the handler addresses in the list of vectors may be again changed to point to a new handler associated with the new stub DLL. See operation 614.

The stub DLL thus addresses the need to provide a persistent target for a hooking application to invoke, when running on a system with another hooking application. To this end, each API hooking application can safely unload and any other API hooking application can still safely invoke what it saw as the original API at the time it hooked.

By virtue of the various features set forth hereinabove, various situations involving simultaneous use of a first and second hooking application may be accommodated. Examples of such situations are outlined in Table 1.

TABLE 1

1. A first hooking application hooks, after which a second hooking application hooks on top of the first hooking application. The second hooking application unhooks while the first hooking application is still hooked.
2. The first hooking application hooks, after which the second hooking application hooks on top of the first hooking application. The first hooking application unhooks, while the second hooking application is still hooked.

In the such cases, one embodiment changes how the first hooking application determines which API was originally called. This is accomplished by calling the vector instead of, for example, a final API handler. For each API hooked, a separate vector is allocated and stored in a list along with information on the original API. This vector includes code to examine the address from which it is being run, and uses this address to determine which API was originally called by searching for a match in a list of hooked API data. Once this data is obtained, the vector calls the API handler, informing the same as to which API was originally hooked.

The stub DLL allows the first hooking application to handle the case where the second hooking application hooks on top of the first hooking application, and to stay hooked after the second hooking application unhooks. If the second hooking application invokes the code in place when it hooked, the stub DLL may receive control. A crash due to accessing invalid memory is thereby avoided. In use, the stub DLL may also check if a full function handler associated with a system DLL is loaded. In this case, when it is not loaded, the stub DLL may proceed as if the full function handler had allowed the API to proceed.

In one embodiment, the stub DLL may be structured as simple as possible to minimize the need to include stub DLL modifications in any upgrade or update to the first hooking application. To facilitate this, the stub DLL may be equipped with two modes of operation. When the first hooking application is running, the stub DLL may do nothing more than pass control to the full function handler associated with the system DLL. Thus, in such mode, the full function DLL handler may process intercepted APIs, perform matching, block the original API if needed, and/or any other desired capability associated with the first hooking application.

In a second mode of operation when the first application is not running, the stub DLL may execute code (e.g. 5 bytes) taken from the original API when the first hooking application hooked the same. In this way, the original API (or any other hooking application that may have been in place), may be run.

Table 2 illustrates additional situations which may exist when the first hooking application hooks on top of the second hooking application.

TABLE 2

1. The second hooking application utility hooks, after which the first hooking application hooks on top of it. The first hooking application unhooks while the second hooking application is still hooked.
2. The second hooking application hooks, after which the first hooking application hooks on top of it. The second hooking application unhooks while the first hooking application is still hooked.

These situations are corollary to the first two cases described above in Table 1. As such, it may be necessary for both the first and second hooking application to implement functionality similar to that set forth above. In cases where the second hooking application is not equipped with such functionality, the original API code may be examined at the time of hooking and compared to an on-disk image of the DLL exporting the API. The first predetermined number of bytes (e.g. 5 bytes, etc) of the API code may thus be checked. If no differences exist between the on-disk and in-memory versions, the API code may be simply copied and the first hooking application may operate, as described above.

However, if there is a difference, any changes may be examined to see if such changes include code for a "far call." If not, the incompatibility is noted and the first hooking application is not executed. As an option, a notification may be sent to an administrator in such situation.

On the other hand, if the changes involve a far call, it may be concluded that another hooking application is active and is using a technique comparable to that set forth hereinabove. In this case, the far call may be changed to a "far jump" and this may be noted in the data associated with the present particular API. Thus, when the original API code is invoked by the first hooking application, it may jump to such code.

In some scenarios, a stack may have been manipulated to show the corresponding address in the original API code as the immediate return address, if the second hooking application is not overwritten by the first hooking application. Thus, the API handler for the second hooking application may be able to determine which API was called by examining the return address.

To receive control back to the API handler of the first hooking application afterwards, a return address may be put into the stack to bring control back to the first hooking application as if the first hooking application was the original caller of the API.

To both the second hooking application and to the original API, the first hooking application would thus appear as the original caller of the API. The stack may be restored upon completion. Further, APIs that remain blocked while the first hooking application unhooks may be handled by the same technique used to clean up the stack after unhooking.

Yet another situation of interest is where the second hooking application is in place when the first hooking application loads and then unhooks while the first hooking application is still hooked. In such case, the handler in the stub DLL may examine the code that was saved when the first hooking application hooked. If such code shows a jump or call in the first predetermined number of bytes (e.g. 5 bytes, etc.) and this differs from the on-disk image of the DLL API, the address being transferred is also examined. If this address is valid, the saved code may be invoked. If this address is not valid, the on-disk version of the code may be used going forward. In this way, the first hooking application may avoid transferring control to an address within a DLL that is no longer loaded. As an optimization, the on-disk version of the DLL API may be saved when the API is initially hooked, and is not retrieved from disk repeatedly.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A system, comprising:
    a processor;
    a first hooking application;
    a second hooking application; and
    computer code including a vector and a stub dynamic link library (DLL) for permitting the first hooking application and the second hooking application to both hook an interface;
    wherein the system is operable such that at least one vector is created for each call hooked by at least one of the first hooking application and the second hooking application.

2. The system of claim 1, wherein the interface includes an application program interface (API).

3. The system of claim 2, wherein the API includes an operating system (OS) API.

4. The system of claim 1, wherein the computer code permits the first hooking application and the second hooking application to both hook interface calls.

5. The system of claim 1, wherein at least one of the first hooking application and the second hooking application includes a security application.

6. The system of claim 5, wherein at least one of the first hooking application and the second hooking application includes an intrusion detection application.

7. The system of claim 6, wherein the vector includes executable computer code.

8. The system of claim 7, wherein the vector is executed upon the interface being invoked.

9. The system of claim 8, wherein data associated with the invoked interface is identified utilizing the vector.

10. The system of claim 9, wherein the data is utilized by a handler.

11. A system, comprising:
    a processor;
    a first hooking application;
    a second hooking application; and
    computer code including a vector and a stub dynamic link library (DLL) for permitting the first hooking application and the second hooking application to both hook an interface;
    wherein the vector includes executable computer code;
    wherein the vector is executed upon the interface being invoked;
    wherein data associated with the invoked interface is identified utilizing the vector;
    wherein the data associated with the invoked interface is identified by: identifying a location of a central processing unit (CPU) instruction pointer.

12. The system of claim 11, wherein the data associated with the invoked interface is further identified by: identifying a start of the vector.

13. The system of claim 12, wherein the start of the vector is identified utilizing arithmetic.

14. The system of claim 12, wherein the data associated with the invoked interface is further identified by: retrieving the data utilizing the identified start of the vector and the CPU instruction pointer.

15. A system, comprising:
    a processor;
    a first hooking application;
    a second hooking application; and
    computer code including a vector and a stub dynamic link library (DLL) for permitting the first hooking application and the second hooking application to both hook an interface;

wherein the stub DLL is reloaded by changing handler addresses in a list of vectors to point to a temporary handler.

16. The system of claim 15, wherein the stub DLL is further reloaded by loading a new stub DLL.

17. The system of claim 16, wherein the stub DLL is further reloaded by changing the handler addresses in the list of vectors to point to a new handler associated with the new stub DLL.

18. A method, comprising:
   simultaneously hooking an interface utilizing, a first hooking application and a second hooking application;
   storing computer code in a memory, the computer code including a vector and a stub dynamic link library (DLL) permits the first hooking application and the second hooking application to both hook an interface;
   creating at least one vector for each call hooked by at least one of the first hooking application and the second hooking application.

19. A memory having stored thereon a computer program product comprising:
   a first hooking application;
   a second hooking application; and
   a vector and a stub dynamic link library (DLL) for permitting the first hooking application and the second hooking application to both hook an interface;
   wherein the computer program product is operable such that at least one vector is created for each call hooked by at least one of the first hooking application and the second hooking application.

* * * * *